United States Patent [19]

Martz

[11] Patent Number: 4,807,847

[45] Date of Patent: Feb. 28, 1989

[54] VALVED OIL PAN PLUG

[76] Inventor: Mitchell R. Martz, 3660 Wellman Rd., Parma, Mich. 49269

[21] Appl. No.: 177,163

[22] Filed: Apr. 4, 1988

[51] Int. Cl.⁴ .............................................. F16K 51/00
[52] U.S. Cl. .................... 251/144; 251/351; 137/327
[58] Field of Search ....................... 251/144, 351, 346; 137/315, 321, 327, 572; 184/1.5

[56] References Cited

U.S. PATENT DOCUMENTS

| | | | |
|---|---|---|---|
| 541,633 | 6/1895 | Schoonmaker | 137/327 |
| 2,823,699 | 2/1958 | Willis | 251/351 |
| 3,727,638 | 4/1973 | Zaremba, Jr. et al. | 251/351 |
| 4,445,530 | 5/1984 | Meixell | 251/351 |
| 4,470,577 | 9/1984 | Warwick | 251/351 |

Primary Examiner—A. Michael Chambers
Attorney, Agent, or Firm—Beaman & Beaman

[57] ABSTRACT

A drain plug for draining oil from vehicle oil pans including a body having a threaded stem for permanently attaching the body to the pan threaded drain hole, a valve threaded into the body includes a conical seal surface seating against a conical valve seat within the body bore. The valve includes an axial bore having inlet ports receiving the pan oil upon the valve seat disengaging from the body seat wherein draining of the oil can be accomplished by rotating the valve relative to the body without removal of the valve from the body. Torque transmitting wrench flats defined on the body and valve are sufficiently spaced apart to prevent simultaneous accidental loosening of the body in the pan drain hole.

2 Claims, 1 Drawing Sheet

4,807,847

VALVED OIL PAN PLUG

BACKGROUND OF THE INVENTION

When draining used oil from an internal combustion engine or transmission pan the usual procedure is to unscrew the threaded plug received within the threaded pan opening and upon removal of the plug the oil drains from the pan.

This procedure, particularly when practiced by the home mechanic, often results in the oil running down the arm of the mechanic upon plug removal, and often the threaded plug is dropped into the waste oil receptacle requiring plug recovery and resulting in soiled hands. The problems created with the changing of engine oil by the home mechanic are well known to those who prefer to change their own engine oil without obtaining professional services.

It is known to utilize a valved oil pan drain plug wherein a portion of the plug remains within the pan threaded hole, and a valve element is associated with the pan attached plug portion to permit oil drainage without complete removal of the valve from the pan attached portion. An example of such a proposed device is shown in U.S. Pat. No. 3,727,638. However, commercially available valved oil pan plugs are difficult to install, the valve may be inadvertently loosened, and, previously, such devices have not been readily available.

It is an object of the invention to provide an oil pan drain plug of the valved type which is of economical construction, easy to install, and minimizes the likelihood of inadvertent loosening of the plug body from the pan when operating the valve.

A further object of the invention is to provide an oil pan drain plug of the valved type wherein the valve is rotated relative to a body threaded into the pan oil plug drain opening and flow through the plug is prevented by a threaded valve operated by a wrench, drainage through the plug occurring upon relatively limited rotation of the valve to the body.

Yet another object of the invention is to provide a two-part oil drain plug including a body and a valve threaded therein, the body being affixed to the pan drain opening, and the valve being positionable between open and closed positions upon rotation of the valve relative to the body.

An additional object of the invention is to provide a pan drain plug threaded into the pan drain opening wherein the plug includes self-tapping thread means to permit attachment of the plug to an opening having worn or damaged threads.

In the practice of the invention a body having a threaded inner end region is threaded into the threaded pan drain opening of an internal combustion engine oil pan, a transmission pan or the like. The body includes an axial bore which is threaded adjacent the body outer end region and a conical valve seat is located in the central region of the bore. Externally, the body is provided with wrench flats adjacent the exterior threads defined on the inner end region, and the body is provided with a cylindrical exterior surface adjacent the outer end region and such exterior surface has an axial dimension greater than the axial dimension of the body wrench flats.

A valve is threaded into the open-ended bore of the body and includes a stem defining a cylindrical wall and the innermost end of the stem is provided with a conical seal surface adapted to engage and seal against the body valve seat. The valve is provided with a coaxial bore intersecting the valve outer end, and inlet ports defined in the inner region of the valve bore establish communication between the valve bore and the stem wall adjacent the valve seal surface. At its outer exterior end, the valve is provided with wrench flats which, when the valve is rotated to engage the seal surface with the body valve seat, the valve wrench flats will be disposed adjacent the body outer end. The axial dimension of the wrench flats is less than the axial dimension of the body cylindrical outer end region.

While the configuration and dimensions of the body and valve wrench flats may be identical, the axial spacing between the wrench flats due to the presence of the body outer cylindrical end region surface minimizes the likelihood of a wrench being applied to the valve wrench flats also engaging the body wrench flats, and the construction of the invention substantially eliminates the possibility of inadvertent unloosening of the body from the pan threaded opening during operation of the valve.

As the body and valve of the plug of the invention may be readily manufactured on automatic screw machines, and as, preferably, the diametrical dimension of the wrench flats of the body and valve are identical in order to minimize the need for different sizes of raw stock, a drain valve in accord with the invention may be economically manufactured, assembled and packaged.

BRIEF DESCRIPTION OF THE PREFERRED DRAWINGS

The aforementioned objects and advantages of the invention will be appreciated from the following description and accompanying drawings wherein:

FIG. 1 is a side elevational view of a valved pan plug in accord with the invention, the valve being shown in the closed condition, FIG. 2 is an elevational view similar to FIG. 1 illustrating the valve in the open condition, FIG. 3 is an elevational, diametrical, sectional view of a valved oil pan plug in accord with the invention illustrating the valve in the closed position, FIG. 4 is a view similar to FIG. 3 illustrating the valve in the open position, FIG. 5 is an exploded elevational view of the plug components of the invention, and FIG. 6 is a perspective elevational view of a variation of valved pan plug in accord with the invention illustrating self-tapping means defined on the plug body threads.

DESCRIPTION OF THE PREFERRED EMBODIMENTS

Figure 1:
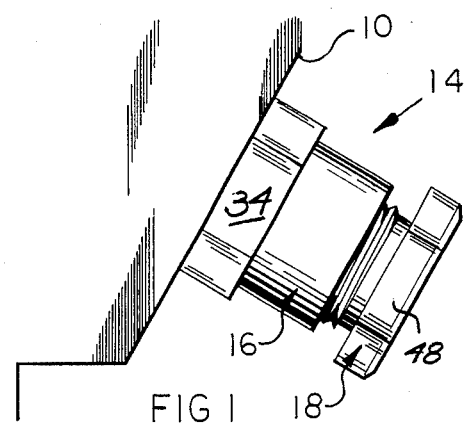
Figure 2:
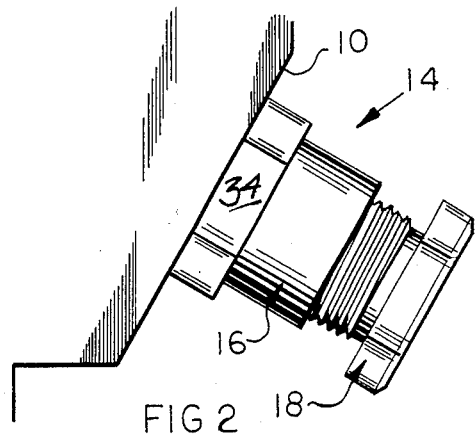

In the drawing figures a vehicle crankcase or transmission pan is represented at 10 and the pan includes the usual threaded drain oil 12. Usually, the drain hole 12 is plugged by a threaded plug received therein. However, in accord with the invention, the plug 14 received within the hole 12 consists of two components, namely a body 16 and a valve 18 threadedly received within the body 16.

The body 16 is of a generally elongated configuration having an inner end region 20 provided with threads which mate and seal with the pan hole threads 12. The body 16 inwardly terminates at the inner end 22.

The body outer end region 24 is of a cylindrical configuration and terminates at the outer end 26. A coaxial passage is defined in the body 16 and includes the reduced diameter bore 28 which intersects the inner end 22. The passageway also includes a bore 30 of an enlarged diameter intersecting the outer end 26 and the bore 30 is internally threaded.

A conical valve seat 32 also constitutes a portion of the body passage and intersects both the bores 28 and 30 and converges in a direction toward bore 28.

In order to permit initial threading of the body 16 into the pan hole 12 wrench flats 34 are defined on the exterior of the body 16 adjacent the inner end region 20 located between the inner end region 20 and the outer end region 24. The wrench flats 34 are of a hexagonal configuration and as the body 16 is preferably formed from hexagonal bar stock the configuration of the flats results from the form of the raw material.

The valve 18, at its central region, includes a stem 36 which is exteriorly threaded. The stem 36, inwardly, includes a reduced cylindrical diameter wall 38 terminating in a conical surface 40 defining a seal surface for engagement with the valve seat 32, as later described.

The valve 18 includes a coaxial bore 42 which intersects the valve outer end 44 and at its inner end the bore 42 terminates short of the seal surface 40. A plurality of ports 46 are defined in the wall 38 communicating with the bore 42 and as the bore 42 intersects the valve outer end 44 fluid entering the ports 46 flows from the valve through the bore 42.

Rotation of the valve 18 is achieved through the hexagonal wrench flats 48, the configuration of the wrench flats resulting from the hexagonal bar stock from which the valve is made, and usually, the dimensional characteristics of the flats 48 will be identical to those of the flats 34 since both the body 16 and valve 18 are usually formed of the same size bar stock for purposes of economy.

The pan plug of the invention is usually installed in the pan hole 12 when the pan has been drained of its waste oil. Assembly of the body 16 to the pan 10 is merely a matter of threading the body inner end region 20 into the threaded pan hole 12. Usually, the threads defined on the inner end region 20 are of the pipe type wherein sealing is achieved at the threads. If the threads on end region 20 are of a machine type it may be advisable to use a compressible washer between the pan and the flats 34. Tightening of the body 16 is achieved by applying a wrench to the wrench flats 34.

Figure 3:
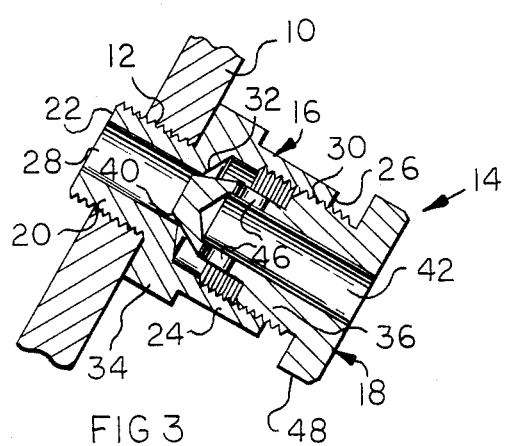
Figure 4:
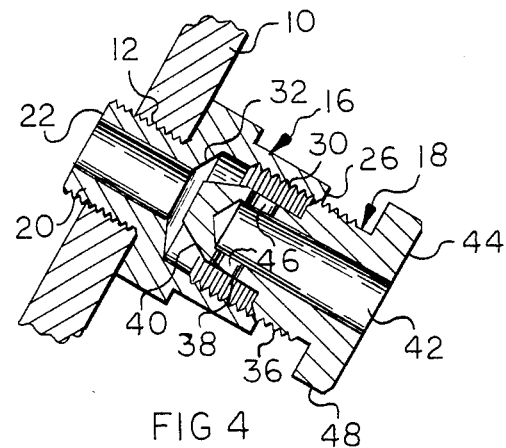
Figure 5:
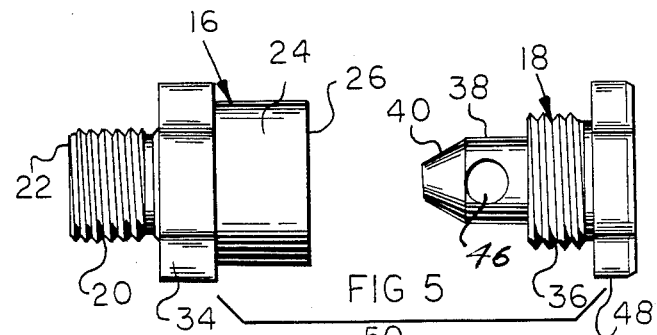

The valve 18 is threaded into the body bore 30 as shown in FIGS. 3 and 4 in that the threads on stem 36 correspond to the threads within bore 30. The valve 18 may be rotated by a wrench or socket applied to the flats 48. The valve 18 is threaded into the body 16 until the seal surface 40 firmly and sealingly engages the valve seat 32. Thereupon, the bore 28 is sealed and oil may be placed within the pan 10.

When it is desired to drain the pan 10 a wrench applied to flats 48 permits the valve 18 to be unloosened and retracted within the bore 30. This axial displacement of the valve separates the seal surface 40 from the valve seat 32 and oil may flow into the ports 46 and from the bore 42 into the waste oil receptacle, not shown.

As the diameter of the wall 38 is significantly less than the diameter of the bore 30, oil may readily flow into the ports 46, and it is not necessary to completely remove the valve 18 from the body 16 and, hence, the valve 18 will not fall into the waste oil or be otherwise misplaced.

With use of the passage 42 within the valve 18 the flow of waste oil is well directed and may be easily received within the waste oil receptacle.

Figure 6:
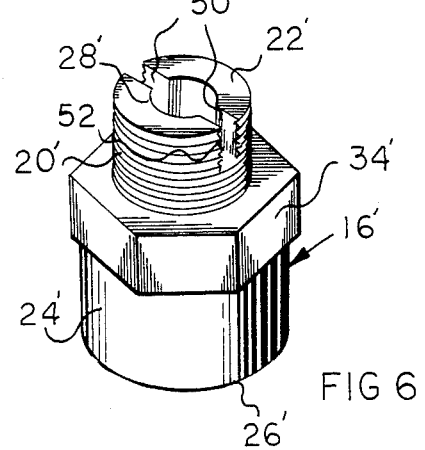

FIG. 6 illustrates another embodiment of the invention and components identical to those previously described are indicated by primed reference numerals.

Occasionally, the threads within pan hole 12 become damaged, and leakage may occur. Such an occurrence may be remedied by using the body configuration shown in FIG. 6 wherein all of the components are identical to those previously described except that inner end region 20' may be of greater length than that described so as to accommodate the axial slots 50 intersecting the body inner end 20' The slots 50 intersect the threads on inner end region 20' and end 22' and the intersection of the slots 50 with the threads define sharp edges 52 rendering the threads self-tapping. The embodiment shown in FIG. 6 is particularly useful wherein the plug of the invention is used to replace a leaking plug within pan 10.

A drain plug in accord with the invention is economical to manufacture and easy to assembly and package. Use by unskilled mechanics and automobile owners is readily accomplished.

The axial dimension of the flats 34 and 48 is preferably less than the axial dimension of the body outer end region 24. With the valve 18 in the closed condition as shown in FIGS. 1 and 3, significant axial spacing exists between the flats 34 and 48 to significantly eliminate the likelihood of a wrench intended to be applied to flats 48 also engaging the flats 34. Additionally, the presence of the cylindrical outer end region 24 prevents torque from being applied to the body 16 when rotating the valve 16 and the location of the flats 34 remotely from the end 26 substantially eliminates inadvertent unloosening of the body 16.

It is appreciated that various modifications to the inventive concepts may be apparent to those skilled in the art without departing from the spirit and scope of the invention.

I claim:

1. An oil pan drain plug characterized by its ease of operation comprising, in combination, an elongated body having a central axis, an inner end, an inner end region, an outer end, and an outer end region, a first cylindrical concentric bore defined in said body extending through said inner end region and intersecting said inner end, a second concentric bore defined in said body extending through said outer end region intersecting said outer end, said second bore having a greater diameter than the diameter of said first bore, a conical concentric valve seat defined in said body intermediate and interconnecting said first and second bores and converging in the axial direction toward said first bore, first threads defined on the exterior of said inner end region in radial alignment with said first cylindrical bore, second threads defined within said second bore, a valve having an inner end, an inner end region, an outer end, an outer end region and a longitudinal axis and a central region, external threads defined on said central region complementary to said body second threads, an axially extending nose defined on said valve inner end region including a wall portion adjacent said central region and a conical seal portion converging toward and intersecting said valve inner end, a coaxial drain bore defined in said valve having an inlet port defined in said valve wall portion and an outlet port, and torque transmitting means defined on the exterior of said body and said valve whereby said valve may be threaded into said body second bore to engage said seal portion against said valve seat to seal said first bore, disengagement of said seal portion from said valve seat permitting fluid flow through said first bore into said inlet port and from said outlet port, said torque transmitting means comprising wrench flats, said wrench flats defined on said body being adjacent said body inner end region and said wrench flats defined on said valve being adjacent said valve outer end whereby said wrench flats will be axially spaced from each other when said valve is threaded into said body.

2. In an oil pan drain plug as in claim 1, at least one axially extending slot defined in said body inner end region intersecting said body inner end and said first threads to define a sharp cutting edge upon said first threads to render said first threads self-tapping.

* * * * *